US006951900B2

(12) United States Patent
Blanchard et al.

(10) Patent No.: US 6,951,900 B2
(45) Date of Patent: Oct. 4, 2005

(54) FILLER CONCENTRATES FOR USE IN THERMOPLASTIC MATERIALS

(75) Inventors: Pierre Blanchard, Reyrieux (FR); Maurice Husson, Chalons en Champagne (FR)

(73) Assignee: OMYA SAS, Paris (FR)

( * ) Notice: Subject to any disclaimer, the term of this patent is extended or adjusted under 35 U.S.C. 154(b) by 0 days.

(21) Appl. No.: 10/203,782

(22) PCT Filed: Feb. 14, 2001

(86) PCT No.: PCT/FR01/00441

§ 371 (c)(1),
(2), (4) Date: Aug. 14, 2002

(87) PCT Pub. No.: WO01/58988

PCT Pub. Date: Aug. 16, 2001

(65) Prior Publication Data

US 2003/0050378 A1 Mar. 13, 2003

(30) Foreign Application Priority Data

Feb. 14, 2000 (FR) .......................... 00 01788

(51) Int. Cl.⁷ ............................. C08K 3/26
(52) U.S. Cl. ............. 524/543; 524/423; 524/431; 524/432; 524/494; 524/451; 524/447; 524/425
(58) Field of Search .................. 524/425, 423, 524/431, 432, 494, 451, 447, 543, 525, 515

(56) References Cited

U.S. PATENT DOCUMENTS

| 3,767,444 A |   | 10/1973 | Zeisberger |
| 4,004,940 A |   | 1/1977  | Cormier |
| 4,229,504 A | * | 10/1980 | Brachman ............... 428/461 |
| 5,856,400 A | * | 1/1999  | Matsumura et al. ....... 524/525 |

FOREIGN PATENT DOCUMENTS

| EP | 0 203 017  |   | 11/1986 |
| FR | 2 346 390  |   | 10/1977 |
| JP | 10-1572 A  | * | 1/1998  |
| JP | 10 001572  |   | 1/1998  |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

The invention relates to the use of isotactic polypropylenes of very great fluidity for the preparation of concentrates of fillers which can be used in thermoplastics of the olefinic type such as polypropylene, polyethylene and as a general rule: the polymers used alone or in a mixture, based on ethylenic monomers containing 2 to 6 atoms of carbon polymerized alone or in a mixture. The invention also relates to the concentrates of fillers or master batches prepared from isotactic polypropylenes of very great fluidity. The invention finally relates to the loaded thermoplastic materials obtained with the addition of selected polypropylenes according to the invention, and the industrial products manufactured from, or containing, such thermoplastic materials.

51 Claims, No Drawings

FILLER CONCENTRATES FOR USE IN THERMOPLASTIC MATERIALS

The invention relates to the use of very high fluidity isotactic polypropylenes for preparing concentrates of fillers which can be used in thermoplastics of the olefinic type such as polypropylene, polyethylene and as a general rule the polymers used alone or in a mixture, based on ethylenic monomers containing 2 to 6 carbon atoms polymerised alone or in a mixture.

These high-fluidity isotactic polypropylenes are used in the invention as a carrier assisting the dispersion or redispersion of mineral materials used as fillers in polyolefins.

The invention also relates to the concentrates of fillers prepared from very high fluidity isotactic polypropylenes.

Finally, the invention relates to the filled thermoplastic materials obtained with the addition of polypropylenes selected according to the invention, and the industrial products manufactured from, or containing, such thermoplastic materials.

It is known that fluid copolymers can be used for preparing loaded master batches, with a high concentration of filler or fillers, that is to say up to levels of around 90% of calcium carbonate and/or talc. These copolymers are generally copolymers of ethylene, propylene and sometimes butylene. They are sold under the name Vestoplast™ by the company Degussa-Hüls, or Rextac™ by the company Huntsman. Some even use atactic polypropylenes which are by-products issuing from the production of isotactic polypropylene such as in particular the polypropylene Alphamin STH-L from the company Alphamin.

The product described in the patent WO 95/17441, which consists of an amorphous polypropylene, is also known.

These aforementioned polymers of the prior art are speciality products, that is to say ones manufactured in low quantities by dedicated and therefore expensive processes, and moreover whose lack of hardness and whose sticky properties (appreciated in the hot-melts industry) are deleterious to the aforementioned application.

In addition, they impair the final mechanical properties in the moulded or extruded articles, produced from the master batches containing them.

Finally, they have softening points (approximately 130–150° C.) very different from the temperature at which they are used (polypropylene 230° C., polyethylene 190° C.). These differences in temperature give rise to undesirable phenomena such as, for example, plate-out or deposition at the die well known to persons skilled in the art of the extrusion of profiled sections or films.

There is a double technical problem posed; it is a case of selecting polymers which could lead to very high concentrations of fillers in the master batches, capable of being redispersed in the different polymeric matrices used in the plastics industry and not degrading the mechanical properties of the industrial products finally obtained after redilution, or even increasing them.

Whereas the prior art proposes master batches prepared with copolymers of ethylene, propylene and sometimes butylene, or atactic (amorphous) polypropylenes, the invention proposes the use of isotactic and therefore crystalline polypropylenes of very high fluidity, for preparing concentrates of fillers which can be used in thermoplastics of the olefinic type.

It is known at the present time that polymers can be used with a crystallinity percentage greater than approximately 50%, of the polypropylene or other type, with a filler content in the master batch which may be as much as 80%, but these products are very limited in fluidity, with a fluidity index, also referred to as the MFI (Melt Flow Index), less than approximately 200 g/10 min (190° C.-10 kg-1.05 mm) according to the standard NF T 51-620 as amended.

According to the standard NF T 51-620, the fluidity index, also referred to as the MFI in the remainder of the application, is the quantity of polymer and/or copolymer, expressed in grams per 10 minutes, which flows at a temperature chosen in the range delimited by the softening and transformation temperatures under a given standardised load (2.16 kg, 5 kg, 10 kg, 21.6 kg) through a die with a given diameter (2.09 mm to 2.10 mm) for a measured time.

In the present application, the standard NF T 51-620 as amended uses, for a polypropylene, a die with a diameter of 1.05 mm and a temperature of 190° C.

The existing machines are moreover adapted to this type of product.

The product described in the patent EP 0 203 017, which has afforded an appreciable improvement, is also known. The improvement stems from a very appreciably higher fluidity, greater than an MFI of 200 g/10 min (190° C.-10 kg-1.05 mm), the filler concentration being centred on approximately 80–90% in the master batch, and the crystallinity percentage being deliberately reduced to approximately 10%, that is to say an amorphous product.

The product described in the patent WO 95/17441, already mentioned above, which has the drawbacks of resulting in plastic articles lacking rigidity, because of problems caused by the resin used, which is sticky and difficult to handle, is also known.

The recent state of the art (EP 0 203 017, WO 95/17441) therefore suggests to a person skilled in the art that, in order to greatly improve the fluidity, which is a necessity for modem products, whilst preserving the characteristic, also essential, of a high concentration of filler or fillers in the master batch, it is necessary to greatly reduce the crystallinity.

It has also been proposed (U.S. Pat. No. 4,455,344) to prepare granulates containing:
  a) 60 to 80 parts by weight of a mineral filler with a mean size of between 0.05 and 100 μm,
  b) 5 to 35 parts by weight of a crystalline polyolefin with a mean size of between 150 and 1000 μm,
  c) and 5 to 35 parts by weight of a binding agent having a melting point less than that of crystalline polyolefin by at least 10° C.

In order to obtain such granulates, the method proposed by this prior art consists in covering the crystalline polyolefin and/or the particles of the mineral filler by means of the binding agent which constitutes an envelope ensuring the adhesion of the particles to each other. Such a method does not lead to the production of a consistent doughy mixture, that is to say with the same composition in the entire mixture at the production temperature, but to the obtaining of inconsistent agglomerates, that is to say with a composition generally different from each other and with irregular dimensions subsequently giving rise to poor redispersion.

It is moreover no doubt the reason why, in the prior art, amorphous products are sold. Such completely amorphous products are more easily obtained by using co- or terpolymers, which then pose, like certain prior products with very low crystallinity, problems of compatibility with polyolefins. These resins are more fluid in the molten state and their granulates or conglomerates stick in the cold presentation state and therefore considerably interfere with their handling and apportioning.

As will be seen in the following description, the invention has, quite the contrary, managed to select polymers of the isotactic polypropylene type, with high-fluidity greater than or equal to an MFI of 200 g/10 min, measured according to the amended standard NF T 51-620 (190° C.-10 kg-1.05 mm), preferably greater than 500 g/10 min, measured in accordance with the amended standard NF T 51-620 (190° C.-10 kg-1.05 mm), with a crystallinity percentage greater than approximately 20%, preferentially between 30% and 90%, preferentially between 50% and 85%, and resulting in a master batch with characteristics both remarkable and surprising, that is to say:

containing a filler content equal to or greater than 80%, having high fluidity, that is to say an MFI greater than or equal to 5 g/10 min (190° C.-5 kg-2.09 mm) measured in accordance with the standard NF T 51-620, preferably greater than or equal to 8 g/10 min (190° C.-5 kg-2.09 mm), and containing at least one polymer of the isotactic polypropylene type having a crystallinity percentage (also referred to as the isotacticity index) greater than approximately 20%, preferentially between 30% and 90%, highly preferentially between 50% and 85%, which is therefore the reverse of the procedure of the prior art.

This isotacticity index represents, for a temperature above 140° C., a fusion energy of between 40 J/g and 138 J/g, as described by Kenji Kamide and Keiko Yamaguchi in "Die Makromolekulare Chemie" (1972) Volume 162, page 222.

This is because this crystallinity percentage or isotacticity index is determined, throughout the present application, by the use of a differential calorimetric method referred to as the DSC (Differential Scanning Calorimetry) method using a DSC 20 apparatus from the company Mettler-Toledo which makes it possible to measure the fusion energy of each polymer and to determine the index by comparison with the value of 138 J/g, which corresponds to an index of 100%. This method of determining the crystallinity percentage or isotacticity index will be referred to as the DSC method throughout the remainder of the present application.

In addition, these master batches make it possible to control the hardness of the grains, a property difficult to achieve up till now.

Other characteristics and advantages of the invention will be better understood from a reading of the following description.

It is useful to state that, throughout the present application, "isotactic polypropylene" will designate isotactic polypropylenes having a very low percentage, unavoidable and known to a person skilled in the art, of atactic polymer or polymer part.

These very high fluidity isotactic polypropylenes are moreover prepared by conventional polymerisation methods (EP 0 523 717 or EP 0 600 461).

A person skilled in the art will understand that these polymers which are subjected to a degradation using a radical-type reaction are to be considered to be technical equivalents.

They are characterised by their fluidity or MFI (Melt Flow Index), measured in accordance with the amended standard NF T 51-620, which is greater than or equal to 200 g/10 min (temperature 190° C., load 10 kg, die 1.05 mm) and by their crystallinity percentage greater than approximately 30%, measured by the DSC method.

One of the characteristics of the invention is therefore also using these isotactic polypropylenes obtained by direct polymerisation. This represents an important or even decisive advantage, since this technique makes it possible to avoid the recycling products or by-products of polymerisation which are often the cause of the degradation of the final mechanical properties and fluctuations in quality which cause difficulty in manufacture.

Another decisive advantage of the invention is to enable a person skilled in the art to design, with a high degree of freedom, exactly the product which he requires for the precise application under consideration and/or to take account of the preexisting industrial equipment. This capability is offered, as will be seen below, by the possibility of preserving the advantages of the invention whilst adjusting the degree of crystallinity and hardness.

The present invention therefore relates to a method for preparing master batches or concentrates of mineral fillers with a high concentration of mineral materials, which can be used for loading thermoplastic materials by means of said mineral fillers, using polymers or mixtures or polymers as a binder, characterised in that the said polymers or mixtures of polymers:

comprise at least one isotactic polypropylene of very high fluidity, and have a crystallinity percentage, commonly referred to as the isotacticity index, greater than approximately 20%, preferentially between 30% and 90%, very preferentially between 50% and 85%, measured by the DSC method as previously described.

In addition, for a good understanding of the terms used, the definitions relating to isotacticity and to atactic and syndiotactic polymers will be specified.

Thus isotacticity characterises, in an olefinic polymer, the presence of substituants on a single side of the carbonaceous skeleton of the molecule whereas on the other hand an atactic polymer has its substituants distributed in a random fashion on both sides.

A syndiotactic polymer for its part has alternating sequences of substituants, on each side. These concepts are entirely familiar to a person skilled in the art, but nevertheless reference can be made to the work Organic Chemistry by Allinger-Cava-Johnson-De Jongh-Lebel-Stevens (McGraw-Hill) 25.4, Polymer Stereochemistry, Synthetic Polymers, Figure. 25.1.

Reference can also be made, for general matters in this field, notably with regard to Tg (vitreous transition temperature) and Tm (melting point), to the article by the High Polymers Laboratory, Catholic University of Louvain, France, April 1990, and to Techniques de l'Ingenieur, Monographs, Polypropylenes, A 3 320.

According to a preferred embodiment, the invention is characterised in that the crystallinity percentage of the polymer or the said mixtures of polymer is between 50 and 85%, measured by the DSC method as previously described.

According to a preferred embodiment, the said polymer binder or mixture of polymers which has an MFI greater than or equal to 200 g/10 min, measured in accordance with the amended standard NF T 51-620 (190° C.-10 kg-1.05 mm), has a fluidity index greater than 500 g/10 min, measured in accordance with the amended standard NF T 51-620 (190° C.-10 kg-1.05 mm).

According to yet another particular embodiment, the invention is characterised in that the said polymer is an isotactic polypropylene.

According to yet another particular embodiment, the invention is characterised in that a mixture of at least one isotactic polypropylene and at least one other crystalline or amorphous olefinic polymer is used.

According to yet another particular embodiment, the invention is characterised in that a mixture of at least one isotactic polypropylene and at least one polyethylene is used.

According to yet another particular embodiment, the invention is characterised in that a mixture of an isotactic polypropylene and a crystalline olefinic polymer such as a polyethylene is used.

According to yet another particular embodiment, the invention is characterised in that a mixture of at least one isotactic polypropylene and at least one amorphous or substantially amorphous olefinic polymer or co- or terpolymer is used. It should be stated that "copolymer" designates equally well polymers obtained from two, three or four monomers or more, where terpolymers are only a particular case. "Substantially amorphous" means polymers or copolymers whose degree of crystallinity is very low, around less than 10 or less than 5%.

According to yet another particular embodiment, the invention is characterised in that a mixture of at least one isotactic polypropylene and at least one atactic or substantially atactic olefinic polymer or copolymer is used.

According to a particular and non-limitative implementation, the organic part of the concentrate of fillers, that is to say the mixture of polymers forming the binder and if applicable the usual additives, is composed of:

- 30% to 100% of isotactic polypropylene of very high fluidity whose MFI measured in accordance with the amended standard NFT 51-620 is greater than or equal to 200 g/10 min (temperature 190° C., load 10 kg, die 1.05 mm);
- 0 to 70% standard amorphous and/or crystalline polyolefins such as polypropylene, polyethylene and as a general rule polymers and copolymers based on ethylenic monomers containing 2 to 6 atoms of carbon alone or in a mixture;
- 0 to 5% additives such as thermal stabilisers, antioxidants, anti-UV agents, dispersants, lubricants, dyes, plasticisers, antistatic agents, flame retardants or nucleation agents well known to a person skilled in the art, metal-passivating agents such as for example cupropassive agents and others.

According to a preferred embodiment, isotactic polypropylenes prepared by direct polymerisation will be used.

The invention also relates to the master batches obtained by means of the said method.

The master batches according to the invention are characterised in that they contain a mineral filler content greater than 80% by weight, preferentially 80.5% to 95% and very preferentially 82% to 93%, in that they have a fluidity or MFI greater than or equal to 5 g/10 min (190° C.-5 kg-2.09 mm) measured in accordance with the standard NF T 51-620, preferably greater than or equal to 8 g/10 min (190° C.-5 kg-2.09 mm), and in that they contain at least one polymer of the isotactic polypropylene type having a crystallinity percentage (also referred to as the isotacticity index) greater than approximately 20%, preferably between 30% and 90%, highly preferentially between 50% and 85%, measured by the DSC method as previously described.

According to yet another particular embodiment, the invention is characterised in that the mineral filler or fillers are chosen from amongst carbonates such as natural calcium carbonates, including notably the different chalks, calcites and marbles, or amongst synthetic carbonates such as calcium carbonates precipitated at different stages of crystallisation, or are chosen from amongst mixed salts of magnesium and calcium such as dolomites or from amongst magnesium carbonate, zinc carbonate, lime, magnesia, barium sulphate such as notably barite, calcium sulphate, silica, magnesium silicates such as talc, wollastonite, clays and other aluminium silicates such as kaolins, mica, oxides or hydroxides of metals or alkaline earths such as magnesium hydroxide, iron oxides, zinc oxide, glass fibre or powder, wood fibre or powder, mineral or organic pigments or mixtures of these compounds, notably mixtures of talc and carbonates or mixtures of titanium and carbonates, mixtures effected before or after the grinding of the minerals.

These fillers can optionally be treated before they are used with one or more agents including notably cetylic acid, stearic acid, behenic acid, the mixtures of said acids with their calcium or zinc salts, phosphates, phosphonates, sulphates and organic sulfonates.

Even more particularly, these fillers are chosen from amongst carbonates, previously treated or not, such as natural calcium carbonates including the various chalks, calcites, marbles or from amongst synthetic carbonates such as precipitated calcium carbonates, or from amongst talc, magnesium hydroxide, barite, titanium dioxide, wollastonite or dolomites and mixtures thereof.

Examples of the nature of fillers are described in detail in, for example, the patent EP 0 203 017, and examples of the shape and size of particles are specified in for example the patent application WO 95/17441 and are in any event very well known to a person skilled in the art.

The invention also relates to a method for preparing concentrates of fillers according to the invention, characterised in that a mixture is effected, on one or more occasions, of the mass of filler or fillers and of the polymer or mixture of polymers according to the invention, and in that the concentrate may contain more than 80% by weight of filler or fillers, in particular 80% to 95% and very preferentially 82% to 93%.

The invention also relates to a method for preparing thermoplastic materials loaded by means of mineral filler or fillers characterised in that the said thermoplastic material or materials are mixed with a master batch, also referred to as a concentrate of filler or fillers prepared according to the invention.

These thermoplastic materials used with the master batch according to the invention are chosen from amongst low-density polyethylenes, linear or branched, or high-density polyethylenes, homo- or copolymer polypropylenes, polyisobutylenes and copolymers obtained during the polymerisation of at least two of the comonomers ethylene, propylene or isobutylene, polyolefins modified by grafting such as maleic anhydride grafted polyolefins or by copolymerisation such as for example halogenated polyolefins, EPDM (ethylene, propylene, diene, monomer) modified polypropylenes, SEBS (styrene, ethylene, butylene, styrene) modified polypropylenes or at least two of the aforementioned polymers and copolymers, in a mixture, or natural or synthetic rubbers or elastomers and thermoplastics, amongst the latter notably SBR rubbers (styrene-butadiene rubber) or thermoplastic EPDM or SEBS.

Normal additives well known to a person skilled in the art, adapted to the final applications, can be incorporated according to this method.

The invention finally relates to the uses of these master batches, possibly in the form of aggregates or granulates, for manufacturing industrial articles, notably moulded industrial articles, as well as the moulded articles obtained.

The methods of transforming these master batches can also be extrusion and notably the extrusion of a film, a microporous film, a sheath or a tube or a profiled section, extrusion blow-moulding, the extrusion of strips or sheets or extrusion coating on paper or metallic foil, or can be thermoforming, injection, calendering, the manufacture of wires and cables and other methods known to a person skilled in the art.

The scope and interest of the invention will be better perceived and illustrated by the non-limitative examples which follow.

EXAMPLE 1

This example relates to the implementation of the selection of the polymers according to the invention making it possible to obtain master batches which contain a filler content equal to or greater than 80%, which have a high fluidity, that is to say an MFI greater than or equal to 5 g/10 min (190° C.-5 kg-2.09 mm) measured in accordance with the standard NF T 51-620 and which contain at least one polymer of the isotactic polypropylene type having a crystallinity percentage (also referred to as the isotacticity index) greater than approximately 20%, preferentially between 30% and 90%, highly preferentially between 50% and 85%, measured by the DSC method as previously described.

For this purpose, for each of tests 1 to 15, 600 g of filler concentrates was prepared in a Z-arm mixture of the Guittard™ type, by mixing the selected resin with the load and the various other additives added simultaneously, the mixing speed being 76 rev/min and the temperature 180° C.

The master batches having been produced in 45 minutes (except for test No 1), the fluidity was measured, that is to say the fluidity index (MFI) in various tests, in accordance with the standard NF T 51-620, namely by the use of a Zwick™ 4105 plastomer at a temperature of 190° C., the thrust weight being 5 kg and the die having a diameter of 2.09 mm.

Test No 1:

This test illustrates the prior art and uses a low-fluidity isotactic copolymer in a composition containing:
- 80.5% by weight of a chalk (Champagne chalk) treated with stearic acid and with a mean diameter of 2 micrometers;
- 19.5% by weight of non-fluid isotactic polypropylene, with an MFI of 9.3 g/10 min (190° C., 10 kg, 1.05 mm) and sold under the reference 3120 MN 1 by the company Appryl.

After 75 minutes of mixing, a non-homogeneous composition of aggregates and powder has been obtained. It is impossible to measure the fluidity.

Test No 2:

This test illustrates the prior art and uses an amorphous polymer in a composition containing:
- 88.0% by weight of a chalk (Champagne chalk) whose mean diameter is 2 micrometers;
- 11.2% by weight of olefinic copolymer, with an MFI greater than 1150 g/10 min (190° C., 10 kg, 1.05 mm) and sold under the reference Vestoplast™ 408 by the company Degussa-Hüls;
- 0.8% by weight of a dispersant of the fatty alcohol phosphate type sold by the company Coatex under the name Coatex Dopp-18.

The MFI obtained has a value of 21.0 g/10 min measured under the aforementioned conditions.

Test No 3:

This test illustrates the prior art and uses an amorphous polymer in a composition containing:
- 87.5% by weight of a chalk (Champagne chalk) treated with stearic acid and with a mean diameter of 2 micrometers;
- 12.5% by weight atactic polypropylene resulting from the purification of an isotactic polypropylene, with an MFI greater than 1150 g/10 min (190° C., 10 kg, 1.05 mm) and sold under the reference Alphamin™ STH-L by the company Alphamin.

The MFI obtained has a value of between 120 g/10 min and 400 g/10 min measured under the aforementioned conditions, and according to the batches of atactic polypropylene used.

Test No 4:

This test illustrates the prior art and uses an amorphous polymer in a composition containing:
- 87.5% by weight of a chalk (Champagne chalk) treated with stearic acid and with a mean diameter of 2 micrometers;
- 12.5% by weight of amorphous polypropylene, with an MFI equal to 450 g/10 min (190° C., 10 kg, 1.05 mm) sold by the company Huntsman under the name Rexflex™ WL 125;

The MFI obtained has a value of 10.0 g/10 min measured under the aforementioned conditions.

Test No 5:

This test illustrates the invention and uses a composition containing:
- 87.5% by weight of a chalk (Champagne chalk) treated with stearic acid and with a mean diameter of 2 micrometers;
- 12.45% by weight of an isotactic polymer with an MFI equal to 970 g/10 min (temperature 190° C., load 10 kg, die 1.05 mm) obtained by peroxide degradation at 300° C. for 15 minutes, of a mixture of 24.8% by mass of Valtec HH442H™ sold by the company Montell and 75.2% by mass of isotactic polypropylene with an MFI equal to 757 g/10 min (temperature 190° C., load 10 kg, die 1.05 mm);
- 0.05% by weight of a thermal stabiliser sold under the name Irganox™ 1010 by the company Ciba-Geigy.

The MFI obtained has a value of 23.0 g/10 min measured under the aforementioned conditions.

Test No 6:

This test illustrates the invention and uses a composition containing:
- 87.5% by weight of a chalk (Champagne chalk) treated with stearic acid and with a mean diameter of 2 micrometers;
- 12.45% by weight of an isotactic polymer with an MFI equal to 1150 g/10 min (temperature 190° C., load 10 kg, die 1.05 mm) obtained by peroxide degradation at 300° C. for 15 minutes, of a mixture of 50% by mass of Valtec HH442H™ sold by the company Montell and 50% by mass of an isotactic polypropylene with an MFI equal to 757 g/10 min (temperature 190° C., load 10 kg, die 1.05 mm);
- 0.05% by weight of a thermal stabiliser sold under the name Irganox™ 1010 by the company Ciba-Geigy.

The MFI obtained has a value of 30.0 g/10 min measured under the aforementioned conditions.

Test No 7:

This test illustrates the invention and uses a composition containing:
- 87.5% by weight of a chalk (Champagne chalk) treated with stearic acid and with a mean diameter of 2 micrometers;
- 12.45% by weight of an isotactic polypropylene with an MFI equal to 535 g/10 min (temperature 190° C., load 10 kg, die 1.05 mm);
- 0.05% by weight of a thermal stabiliser sold under the name Irganox™ 1010 by the company Ciba-Geigy.

The MFI obtained has a value of 11.5 g/10 min measured under the aforementioned conditions.

Test No 8:

This test illustrates the invention and uses a composition containing:

- 87.5% by weight of a chalk (Champagne chalk) treated with a mixture of stearic acid-calcium stearate and with a mean diameter of 2 micrometers;
- 12.45% by weight of an isotactic polypropylene with an MFI of 632 g/10 min (temperature 190° C., load 10 kg, die 1.05 mm);
- 0.05% by weight of a thermal stabiliser sold under the name of Irganox™ 1010 by the company Ciba-Geigy.

The MFI obtained has a value of 16.4 g/10 min measured under the aforementioned conditions.

Test No 9:

This test illustrates the invention and uses a composition containing:

- 87.5% by weight of a chalk (Champagne chalk) treated with stearic acid and with a mean diameter of 2 micrometers;
- 12.45% by weight of an isotactic polypropylene with an MFI of 757 g/10 min (temperature 190° C., load 10 kg, die 1.05 mm);
- 0.05% by weight of a thermal stabiliser sold under the name Irganox™ 1010 by the company Ciba-Geigy.

The MFI obtained has a value of 18.0 g/10 min measured under the aforementioned conditions.

Test No 10:

This test illustrates the invention and uses a composition containing:

- 87.5% by weight of a chalk (Champagne chalk) treated with stearic acid and with a mean diameter of 2 micrometers;
- 11.55% by weight of an isotactic polypropylene with an MFI of 757 g/10 min (temperature 190° C., load 10 kg, die 1.05 mm);
- 0.90% by weight of a dispersant of the fatty alcohol phosphate type sold by the company Coatex under the name Coatex Dopp-18;
- 0.05% by weight of a thermal stabiliser sold under the name Irganox™ 1010 by the company Ciba-Geigy.

The MFI obtained has a value of 32.0 g/10 min measured under the aforementioned conditions.

Test No 11:

This test illustrates the invention and uses a composition containing:

- 87.5% by weight of a chalk (Champagne chalk) treated with stearic acid and with a mean diameter of 2 micrometers;
- 11.55% by weight of an isotactic polypropylene with an MFI of 757 g/10 min (temperature 190° C., load 10 kg, die 1.05 mm);
- 0.45% by weight of a dispersant of the fatty alcohol phosphate type sold by the company Coatex under the name Coatex Dopp-18;
- 0.45% by weight of zinc stearate;
- 0.05% by weight of a thermal stabiliser sold under the name Irganox™ 1010 by the company Ciba-Geigy.

The MFI obtained has a value of 19.0 g/10 min measured under the aforementioned conditions.

Test No 12:

This test illustrates the invention and uses a composition containing:

- 87.5% by weight of a chalk (Champagne chalk) treated with stearic acid and with a mean diameter of 2 micrometers;
- 10.0% by weight of an isotactic polypropylene with an MFI of 840 g/10 min (temperature 190° C., load 10 kg, die 1.05 mm);
- 2.45% by weight of a low-density polyethylene sold by the company Polimeri Europa under the name Riblene™ MV 10;
- 0.05% by weight of a thermal stabiliser sold under the name Irganox™ 1010 by the company Ciba-Geigy.

The MFI obtained has a value of 26.2 g/10 min measured under the aforementioned conditions.

Test No 13:

This test illustrates the invention and uses a composition containing:

- 87.5% by weight of a chalk (Champagne chalk) treated with stearic acid and with a mean diameter of 2 micrometers;
- 12.45% by weight of an isotactic polypropylene with an MFI of 295 g/10 min (temperature 190° C., load 10 kg, die 1.05 mm) sold under the name Aldrich 800 by the company Aldrich;
- 0.05% by weight of a thermal stabiliser sold under the name Irganox™ 1010 by the company Ciba-Geigy.

The MFI obtained has a value of 8.4 g/10 min measured under the aforementioned conditions.

Test No 14:

This test illustrates the invention and uses a composition containing:

- 87.5% by weight of a chalk (Champagne chalk) treated with stearic acid and with a mean diameter of 2 micrometers;
- 12.45% by weight of an isotactic polypropylene with an MFI of 1038 g/10 min (temperature 190° C., load 10 kg, die 1.05 mm);
- 0.05% by weight of a thermal stabiliser sold under the name of Irganox™ 1010 by the company Ciba-Geigy.

The MFI obtained has a value of 25.2 g/10 min measured under the aforementioned conditions.

Test No 15:

This test illustrates the invention and uses a composition containing:

- 87.5% by weight of a chalk (Champagne chalk) treated with stearic acid and with a mean diameter of 2 micrometers;
- 12.45% by weight of an isotactic polypropylene with an MFI of 200 g/10 min (temperature 190° C., load 10 kg, die 1.05 mm);
- 0.05% by weight of a thermal stabiliser sold under the name of Irganox™ 1010 by the company Ciba-Geigy.

The MFI obtained has a value of 5.0 g/10 min measured under the aforementioned conditions.

Once all these tests and fluidity measurements have been made, the isotacticity index according to the aforementioned DSC method is measured.

The different results obtained are set out in Table 1 below.

TABLE 1

| | Test No | % by weight of mineral Filler in master batch | % by weight of isotactic polypropylene in master batch | MFI (g/10 min) of the isotactic Polypropylene (190° C./10 kg/1.05 mm) | MFI (g/10 min) of the master batch (190° C./5 kg/2.09 mm) | Crystallinity percentage or isotacticity index of the fluid isotactic polymer |
|---|---|---|---|---|---|---|
| Prior art | 1 | 80.5 | 19.5 | 9.3 | Measurement impossible | 53.2 |
| Prior art | 2 | 88.0 | 0 | — | 21.0 | 0 |
| Prior art | 3 | 87.5 | 0 | — | 120–400 | 0 |
| Prior art | 4 | 87.5 | 0 | 450 | 10.0 | 11.4 |
| Invention | 5 | 87.5 | 12.45 | 970 | 23.0 | 68.0 |
| Invention | 6 | 87.5 | 12.45 | 1150 | 30.0 | 74.6 |
| Invention | 7 | 87.5 | 12.45 | 535 | 11.5 | 68.2 |
| Invention | 8 | 87.5 | 12.45 | 632 | 16.4 | 43.5 |
| Invention | 9 | 87.5 | 12.45 | 757 | 18.0 | 65.0 |
| Invention | 10 | 87.5 | 11.55 | 757 | 32.0 | 65.0 |
| Invention | 11 | 87.5 | 11.55 | 757 | 19.0 | 65.0 |
| Invention | 12 | 87.5 | 10.0 | 840 | 26.2 | 61.6 |
| Invention | 13 | 87.5 | 12.45 | 295 | 8.4 | 68.5 |
| Invention | 14 | 87.5 | 12.45 | 1038 | 25.2 | 77.4 |
| Invention | 15 | 87.5 | 12.45 | 200 | 5.0 | 74.2 |

A reading of Table 1 shows that the selection of isotactic polypropylene, with high fluidity greater than or equal to an MFI of 200 g/10 min, measured in accordance with the amended standard NF T 51-620 (190° C.-10 kg-1.05 mm), preferably greater than 500 g/10 min, measured in accordance with the amended standard NF T 51-620 (190° C.-10 kg-1.05 mm), with a crystallinity percentage greater than approximately 20%, preferentially between 30% and 90%, highly preferentially between 50% and 85%, makes it possible to obtain master batches which contain a filler content equal to or greater than 80%, which have high-fluidity, that is to say an MFI greater than or equal to 5 g/10 min (190° C.-5 kg-2.09 mm) measured in accordance with the standard NF T 51-620 and which contain at least one polymer of the isotactic polypropylene type having a crystallinity percentage (also referred to as the isotacticity index) greater than approximately 20%, preferentially between 30% and 90%, highly preferentially between 50% and 85%, measured by the DSC method as previously described.

EXAMPLE 2

This example relates to the use, according to the invention, of different mineral fillers making it possible to obtain master batches which have a filler content greater than 80%, which have a high fluidity, that is to say an MFI greater than or equal to 5 g/10 min (190° C.-5 kg-2.09 mm) measured in accordance with the standard NF T 51-620 and which contain at least one polymer of the isotactic polypropylene type having a crystallinity percentage (also referred to as the isotacticity index) greater than approximately 20%, preferentially between 30% and 90%, highly preferentially between 50% and 85%, measured by the DSC method as previously described.

For this purpose, for each of tests 16 to 24, 600 g of filler concentrates were prepared in a Z-arm mixer of the Guittard™ type by mixing the selected resin with the filler and the various other additives added simultaneously, the mixing speed being 76 rev/min and the temperature 180° C.

The master batches having been produced in 45 minutes, the fluidity, that is to say the fluidity index (MFI) of the various tests, was measured, in accordance with the standard NF T 51-620, namely by the use of a Zwick™ 4105 plastomer at a temperature of 190° C., the thrust weight being 5 kg and the die having a diameter of 2.09 mm.

Test No 16:
This test illustrates the invention and uses a composition containing:
  41.5% by weight of a chalk (Champagne chalk) treated with stearic acid and with a mean diameter of 2 micrometers;
  41.5% by weight of a talc with a granulometry such that 41% of the particles have a diameter less than 5 micrometers;
  15.9% by weight of an isotactic polypropylene with an MFI of 840 g/10 min (temperature 190° C., load 10 kg, die 1.05 mm);
  1.0% by weight of zinc stearate;
  0.1% by weight of a thermal stabiliser sold under the name Irganox™ 1010 by the company Ciba-Geigy.
The MFI obtained has a value of 10.6 g/10 min measured under the aforementioned conditions.

Test No 17:
This test illustrates the invention and uses a composition containing:
  64.25% by weight of a chalk (Champagne chalk) treated with stearic acid and with a mean diameter of 2 micrometers;
  21.25% by weight of a talc with a granulometry such that 41% of the particles have a diameter less than 5 micrometers;
  13.9% by weight of an isotactic polypropylene with an MFI of 840 g/10 min (temperature 190° C., load 10 kg, die 1.05 mm);
  0.50% by weight of a dispersant of the fatty alcohol phosphate type sold by the company Coatex under the name Coatex Dopp-18;
  0.1% by weight of a thermal stabiliser sold under the name Irganox™ 1010 by the company Ciba-Geigy.
The MFI obtained has a value of 20.7 g/10 min measured under the aforementioned conditions.

Test No 18:
This test illustrates the invention and uses a composition containing:
  75.0% by weight of a chalk (Champagne chalk) treated with stearic acid and with a mean diameter of 2 micrometers;

13.0% by weight of a commercial magnesium hydroxide with a mean diameter of 1.4–1.8 micrometers;

8.9% by weight of an isotactic polypropylene with an MFI equal to 840 g/10 min (temperature 190° C., load 10 kg, die 1.05 mm) and 2.0% by weight of a polypropylene copolymer grade 100 sold by the company Montell under the name Moplen™ EP-N 31 MA;

1.0% by weight of wax sold by the company Allied Signal under the reference PE AC6;

0.1% by weight of a thermal stabiliser sold under the name Irganox™ 1010 by the company Ciba-Geigy.

The MFI obtained has a value of 14.5 g/10 min measured under the aforementioned conditions.

Test No 19:

This test illustrates the invention and uses a composition containing:

87.0% by weight of a calcite whose mean diameter is 1.8 micrometers;

9.9% by weight of an isotactic polypropylene with an MFI equal to 840 g/10 min. (temperature 190° C., load 10 kg, die 1.05 mm) and 1.5% by weight of a polypropylene copolymer grade 100 sold by the company Montell under the name Moplen™ EP-N 31 MA;

1.5% by weight of zinc stearate;

0.1% by weight of a thermal stabiliser sold under the name Irganox™ 1010 by the company Ciba-Geigy.

The MFI obtained has a value of 10.8 g/10 min measured under the aforementioned conditions.

Test No 20:

This test illustrates the invention and uses a composition containing:

41.0% by weight of a chalk (Champagne chalk) treated with stearic acid and with a mean diameter of 2 micrometers;

41.0% by weight of a dolomite with a mean diameter of 3 micrometers;

17.9% by weight of an isotactic polypropylene with an MFI of 238 g/10 min (temperature 190° C., load 10 kg, die 1.05 mm);

0.1% by weight of a thermal stabiliser sold under the name Irganox™ 1010 by the company Ciba-Geigy.

The MFI obtained has a value of 95.5 g/10 min measured under the aforementioned conditions.

Test No 21:

This test illustrates the invention and uses a composition containing:

81.0% by weight of marble whose mean diameter is 5 micrometers;

5.0% by weight of a precipitated calcium carbonate sold by the company Schäfer-Kalk under the name Precarb™ 400;

10.6% by weight of an isotactic polypropylene with an MFI of 757 g/10 min (temperature 190° C., load 10 kg, die 1.05 mm) and 2.0% by weight of a low-density polyethylene sold by the company Polimeri Europa under the name Riblene™ MV 10;

0.5% by weight of a dispersant of the fatty alcohol phosphate type sold by the company Coatex under the name Coatex Dopp-18;

0.8% by weight of zinc stearate;

0.1% by weight of a thermal stabiliser sold under the name Irganox™ 1010 by the company Ciba-Geigy.

The MFI obtained has a value of 48.2 g/10 min measured under the aforementioned conditions.

Test No 22:

This test illustrates the invention and uses a composition containing:

32.8% by weight of a chalk (Champagne chalk) simply treated with stearic acid and with a mean diameter of 2 micrometers;

60.2% by weight of barite whose mean diameter is 5 micrometers;

4.6% by weight of an isotactic polypropylene with an MFI equal to 757 g/10 min (temperature 190° C., load 10 kg, die 1.05 mm) and 0.5% by weight of a polypropylene copolymer grade 100 sold by the company Montell under the name Moplen™ EP-N 31 MA;

0.9% by weight of a dispersant of the fatty alcohol phosphate type sold by the company Coatex under the name Coatex Dopp-18;

0.9% by weight of zinc stearate;

0.1% by weight of a thermal stabiliser sold under the name Irganox™ 1010 by the company Ciba-Geigy.

The MFI obtained has a value of 26.0 g/10 min measured under the aforementioned conditions.

Test No 23:

This test illustrates the invention and uses a composition containing:

42.0% by weight of a chalk (Champagne chalk) simply treated with stearic acid and with a mean diameter of 2 micrometers;

43.0% by weight of processed titanium dioxide (Futile) sold under the name RL 90;

7.3% by weight of an isotactic polypropylene with an MFI of 757 g/10 min (temperature 190° C., load 10 kg, die 1.05 mm) and 6.7% by weight of a low-density polyethylene sold by the company Polimeri Europa under the name Riblene™ MV 10;

0.9% by weight of zinc stearate;

0.1% by weight of a thermal stabiliser sold under the name Irganox™ 1010 by the company Ciba-Geigy.

The MFI obtained has a value of 149.0 g/10 min measured under the aforementioned conditions.

Test No 24:

This test illustrates the invention and uses a composition containing:

19.2% by weight of a chalk (Champagne chalk) simply treated with stearic acid and with a mean diameter of 2 micrometers;

60.5% by weight of barite whose mean diameter is 5 micrometers;

11.5% by weight of treated wollastonite with a mean fibre length of 90 micrometers;

6.1% by weight of an isotactic polypropylene with an MFI equal to 757 g/10 min (temperature 190° C., load 10 kg, die 1.05 mm) and 1.7% by weight of a polypropylene copolymer grade 100 sold by the company Montell under the name Moplen™ EP-N 31 MA;

0.9% by weight of zinc stearate;

0.1% by weight of a thermal stabiliser sold under the name Irganox™ 1010 by the company Ciba-Geigy.

The MFI obtained has a value of 146.0 g/10 min measured under the aforementioned conditions.

Test No 25:

This test illustrates the invention and uses a composition containing:

75.0% by weight of a chalk (Champagne chalk) simply treated with stearic acid and with a mean diameter of 2 micrometers;

12.0% by dry weight of a 62.2% (dry weight) aqueous solution of an untreated chalk from Champagne containing no acrylic dispersant and whose mean diameter is 1 micrometer;

13.0% by dry weight of an isotactic polypropylene with an MFI equal to 840 g/10 min (temperature 190° C., load 10 kg, die 1.05 mm).

The MFI obtained has a value of 12.0 g/10 min measured under the aforementioned conditions.

The different results obtained are set out in Table 2 below.

EXAMPLE 3

This example relates to the redispersion of the master batches in different polyolefins.

To do this and for each of tests 26 to 53, a strip with a thickness of 3 mm is extruded through a flat die, by means of a Torey single-screw extruder whose screw has a diameter D of 25 mm and a length equal to 15 D, whilst the die has a length of 16 mm and a height of 2.5 mm. The speed of rotation of the screw is 50 revolutions per minute, the compression ratio 3 and the extrusion temperature 170° C.

TABLE 2

|  | Test No | Type of mineral filler | % by weight of mineral filler in master batch | % by weight of isotactic Polypropylene in master batch | MFI (g/10 min) of the isotactic polypropylene (190° C./10 kg/1.05 mm) | MFI (g/10 min) of the isotactic polypropylene (190° C./5 kg/2.09 mm) | Crystallinity percentage or isotacticity index of the fluid isotactic polymer |
|---|---|---|---|---|---|---|---|
| Invention | 16 | chalk-talc | 41.5–41.5 | 15.9 | 840 | 10.6 | 61.6 |
| Invention | 17 | chalk-talc | 64.25–21.25 | 13.9 | 840 | 20.7 | 61.6 |
| Invention | 18 | chalk-magnesium hydroxide | 75.0–13.0 | 8.9 | 840 | 14.5 | 61.6 |
| Invention | 19 | calcite | 87.0 | 9.9 | 840 | 10.8 | 61.6 |
| Invention | 20 | chalk-dolomite | 41.0–41.0 | 17.9 | 238 | 95.5 | 35.0 |
| Invention | 21 | marble-precipitated calcium carbonate | 81.0–5.0 | 10.6 | 757 | 48.2 | 65.0 |
| Invention | 22 | chalk-barite | 32.8–60.2 | 4.6 | 757 | 26.0 | 65.0 |
| Invention | 23 | chalk-titanium dioxide | 42.0–43.0 | 7.3 | 757 | 149.0 | 65.0 |
| Invention | 24 | chalk-barite wollastonite | 19.2–60.5–11.5 | 6.1 | 757 | 146.0 | 65.0 |
| Invention | 25 | Chalk | 87.0 | 13.0 | 840 | 12.0 | 61.6 |

A reading of Table 2 shows that the use of isotactic polypropylene, with high fluidity greater than or equal to an MFI of 200 g/10 min, measured in accordance with the amended standard NF T 51-620 (190° C.-10 kg-1.05 mm), preferably greater than 500 g/10 min, measured in accordance with the amended standard NF T 51-620 (190° C. -10 kg-1.05 mm), with a crystallinity percentage greater than approximately 20%, preferentially between 30% and 90%, preferentially between 50% and 85%, makes it possible to obtain master batches which contain different mineral fillers and with a filler content equal to or greater than 80%, which have high fluidity, that is to say an MFI greater than or equal to 5 g/10 min (190° C.-5 kg-2.09 mm) measured in accordance with the standard NF T 51-620 and which contain at least one polymer of the isotactic polypropylene type having a crystallinity percentage (also referred to as the isotacticity index) greater than approximately 20%, preferentially between 30% and 90%, highly preferentially between 50% and 85%, measured by the DSC method as previously described.

In addition, it can be remarked that the coupling of the high-fluidity isotactic polypropylene with one or more polymers allows:

an adjustment of the fluidity of the filler concentrate for the purpose of producing mixtures with fillers of different natures and with characteristics very different from each other such as notably the granulometry, to adapt the formula to the method, an increase in the compatibility of the filler concentrate with the medium in which it is to be dispersed, the obtaining of a less expensive formula, adjustment of the hardness of the concentrates.

for polyethylene and 210° C. for polypropylene copolymer or homopolymer.

This extrusion is effected by the successive feeding of the extruder with the raw redispersion polyolefin serving as a reference and the mixtures consisting of the same polyolefin and the master batches according to the invention to be tested so as to incorporate 20% by weight of filler with respect to the total mass.

Examination under a binocular magnifier with magnification of 50 of each of the dispersions made it possible to note the visual appearance of the dispersion from 1 to 6 with the value 1 when there is no dispersion and the value 6 when there is very good dispersion, that is to say when there are no black spots corresponding to the degraded polyolefin and white spots corresponding to the filler.

The results are as follows:

Test No 26:

This test illustrates the invention and uses the master batch according to the invention of test No 5 and the polypropylene homopolymer resin sold by the company Montell under the name Montell™ TM 1600 K.

The value 6 is attributed to the dispersion.

Test No 27:

This test illustrates the invention and uses the master batch according to the invention of test No 6 and the polypropylene homopolymer resin sold by the company Montell under the name Montell™ TM 1600 K.

The value 6 is attributed to the dispersion.

Test No 28:

This test illustrates the invention and uses the master batch according to the invention of test No 7 and the polypropylene homopolymer resin sold by the company Montell under the name Montell™ TM 1600 K.

The value 6 is attributed to the dispersion.

Test No 29:

This test illustrates the invention and uses the master batch according to the invention of test No 8 and the polypropylene homopolymer resin sold by the company Montell under the name Montell™ TM 1600 K.

The value 6 is attributed to the dispersion.

Test No 30:

This test illustrates the invention and uses the master batch according to the invention of test No 9 and the polypropylene homopolymer resin sold by the company Montell under the name Montell™ TM 1600 K.

The value 6 is attributed to the dispersion.

Test No 31:

This test illustrates the invention and uses the master batch according to the invention of test No 10 and the polypropylene homopolymer resin sold by the company Montell under the name Montell™ TM 1600 K.

The value 6 is attributed to the dispersion.

Test No 32:

This test illustrates the invention and uses the master batch according to the invention of test No 11 and the polypropylene homopolymer resin sold by the company Montell under the name Montell™ TM 1600 K.

The value 6 is attributed to the dispersion.

Test No 33:

This test illustrates the invention and uses the master batch according to the invention of test No 12 and the polypropylene homopolymer resin sold by the company Montell under the name Montell™ TM 1600 K.

The value 6 is attributed to the dispersion.

Test No 34:

This test illustrates the invention and uses the master batch according to the invention of test No 13 and the polypropylene homopolymer resin sold by the company Montell under the name Montell™ TM 1600 K.

The value 6 is attributed to the dispersion.

Test No 35:

This test illustrates the invention and uses the master batch according to the invention of test No 14 and the polypropylene homopolymer resin sold by the company Montell under the name Montell™ TM 1600 K.

The value 6 is attributed to the dispersion.

Test No 36:

This test illustrates the invention and uses the master batch according to the invention of test No 15 and the polypropylene homopolymer resin sold by the company Montell under the name Montell™ TM 1600 K.

The value 6 is attributed to the dispersion.

Test No 37:

This test illustrates the invention and uses the master batch according to the invention of test No 16 and the polypropylene homopolymer resin sold by the company Montell under the name Montell™ TM 1600 K.

The value 6 is attributed to the dispersion.

Test No 38:

This test illustrates the invention and uses the master batch according to the invention of test No 17 and the polypropylene homopolymer resin sold by the company Montell under the name Montell™ TM 1600 K.

The value 6 is attributed to the dispersion.

Test No 39:

This test illustrates the invention and uses the master batch according to the invention of test No 18 and the polypropylene homopolymer resin sold by the company Montell under the name Montell™ TM 1600 K.

The value 6 is attributed to the dispersion.

Test No 40:

This test illustrates the invention and uses the master batch according to the invention of test No 19 and the polypropylene homopolymer resin sold by the company Montell under the name Montell™ TM 1600 K.

The value 6 is attributed to the dispersion.

Test No 41:

This test illustrates the invention and uses the master batch according to the invention of test No 20 and the polypropylene homopolymer resin sold by the company Montell under the name Montell™ TM 1600 K.

The value 6 is attributed to the dispersion.

Test No 42:

This test illustrates the invention and uses the master batch according to the invention of test No 21 and the polypropylene homopolymer resin sold by the company Montell under the name Montell™ TM 1600 K.

The value 6 is attributed to the dispersion.

Test No 43:

This test illustrates the invention and uses the master batch according to the invention of test No 22 and the polypropylene homopolymer resin sold by the company Montell under the name Montell™ TM 1600 K.

The value 6 is attributed to the dispersion.

Test No 44:

This test illustrates the invention and uses the master batch according to the invention of test No 23 and the polypropylene homopolymer resin sold by the company Montell under the name Montell™ TM 1600 K.

The value 6 is attributed to the dispersion.

Test No 45:

This test illustrates the invention and uses the master batch according to the invention of test No 24 and the polypropylene homopolymer resin sold by the company Montell under the name Montell™ TM 1600 K.

The value 6 is attributed to the dispersion.

Test No 46:

This test illustrates the invention and uses the polypropylene copolymer resin sold by the company Appryl under the name Appryl™ 3120 MN 1 and a composition according to the invention containing:

- 87% by weight of a chalk (Champagne chalk) treated with stearic acid and with a mean diameter of 2 micrometers;
- 9.1% by weight of amorphous polypropylene, with an MFI of 450 g/10 min (temperature 190° C., load 10 kg, die 1.05 mm) sold by the company Huntsman under the name Rexflex™ WL 125;
- 3.9% by weight of an isotactic polypropylene with an MFI of 840 g/10 min (temperature 190° C., load 10 kg, die 1.05 mm).

The value 6 is attributed to the dispersion.

Test No 47:

This test illustrates the invention and uses the master batch according to the invention of test No 14 and the polypropylene copolymer resin sold by the company Appryl under the name Appryl™ 3120 MN 1.

The value 6 is attributed to the dispersion.

Test No 48:

This test illustrates the invention and uses the master batch according to the invention of test No 14 and the high-density polyethylene resin sold by the company Plüss-Staufer under the name Hostalen™ GD 7225.

The value 6 is attributed to the dispersion.

Test No 49:

This test illustrates the invention and uses the master batch according to the invention of test No 12 and the high-density polyethylene resin sold by the company Plüss-Staufer under the name Hostalen™ GD 7225.

The value 6 is attributed to the dispersion.

Test No 50:

This test illustrates the invention and uses the high-density polyethylene resin sold by the company Plüss-Staufer under the name Hostalen™ GD 7225 and the master batch according to the invention with the composition:

- 87.0% by weight of a chalk (Champagne chalk) treated with stearic acid and with a mean diameter of 2 micrometers;
- 10.0% by weight of an isotactic polypropylene with an MFI of 840 g/10 min (temperature 190° C., load 10 kg, die 1.05 mm) and 3.0% by weight of a grade 100 polypropylene copolymer sold by the company Montell under the name Moplen™ EP-N 31 MA.

The value 6 is attributed to the dispersion.

Test No 51:

This test illustrates the invention and uses the high-density polyethylene resin sold by the company Plüss-Staufer under the name Hostalen™ GD 7225 and the master batch according to the invention with the composition:

- 86.0% by weight of a chalk (Champagne chalk) treated with stearic acid and with a mean diameter of 2 micrometers;
- 7.5% by weight of an isotactic polypropylene with an MFI of 840 g/10 min (temperature 190° C., load 10 kg, die 1.05 mm) and 6.5% by weight of a grade 100 polypropylene copolymer sold by the company Montell under the name Moplen™ EP-N 31 MA.

The value 6 is attributed to the dispersion.

Test No 52:

This test illustrates the invention and uses the low-density polyethylene resin sold by the company BASF under the name Lupolene™ 2420 H and a composition according to the invention containing:

- 87% by weight of a chalk (Champagne chalk) treated with stearic acid and with a mean diameter of 2 micrometers;
- 9.1% by weight of amorphous polypropylene, with an MFI of 450 g/10 min (temperature 190° C., load 10 kg, die 1.05 mm) sold by the company Huntsman under the name Rexflex™ WL 125;
- 3.9% by weight of an isotactic polypropylene with an MFI of 840 g/10 min (temperature 190° C., load 10 kg, die 1.05 mm).

The value 6 is attributed to this dispersion.

Test No 53:

This test illustrates the invention and uses the master batch according to the invention of test No 14 and the low-density polyethylene resin sold by BASF under the name Lupolene™ 2420 H.

The value 6 is attributed to the dispersion.

A reading of all these results shows that the selection of an isotactic polypropylene with high fluidity greater than or equal to 200 g/10 min as previously measured makes it possible to obtain an excellent redispersion whatever the redispersion resin or the filler making up the master batch.

EXAMPLE 4

This example relates to the mechanical properties of various master batches according to the invention produced on an industrial scale.

To do this, and for each of tests 54 to 65, test pieces produced by injection are subjected to mechanical property tests.

To do this, standardised test pieces are produced (ISO 1873-2:1989) by means of a microprocessor-controlled Nestal Neomat 170/90 press with a closure force of 900 kN, a screw diameter of 32 mm and a length/diameter ratio of 18.8.

The main setting parameters for the press are as follows:

the temperature of the material is between 200° C. and 240° C. depending on the dispersion polymer or copolymer used, the temperature of the mould is 40° C., the nozzle temperature changes between 180° C. and 240° C. depending on the dispersion polymer or copolymer used, the maximum injection speed is 200 m/s, the injection pressure is 100 bars, the length of the cycle is around 62 seconds, comprising a cooling time of 30 seconds, an injection time of 2 seconds, a holding time of 25 seconds and finally a time between two cycles of 5 seconds.

The press is fed successively with polymers or copolymers alone serving as a reference and mixtures of the same polymers or copolymers into which the master batches according to the invention have been introduced and produced, in the form of granulates at a rate of 155 kg/h, by adding the different constituents in a continuous double-screw mixer terminating in a single-screw extruder at the discharge of which a granulator is fitted.

The mechanical property tests carried out are the determination of the modulus of elasticity in four-point bending according to DIN 53457 and determining the Charpy impact at 23° C. according to the standard DIN 53453.

Test No 54:

This test illustrates the prior art and uses a dispersion containing 60% by weight of the high-density polyethylene resin sold by the company Plüss-Staufer under the name Hostalen™ GD 7225 and 40% by weight of the master batch of test No 2 of the prior art.

The results obtained are equal to 799 N/mm$^2$ for the modulus of elasticity in four-point bending in accordance with the standard DIN 53457 and 3.4 kJ/m$^2$ for Charpy impact at 23° C. in accordance with the standard DIN 53453.

Test No 55:

This test illustrates the invention and uses a dispersion containing 60% by weight of the high-density polyethylene resin sold by the company Plüss-Staufer under the name Hostalen™ GD 7225 and 40% by weight of the master batch according to the invention with the composition:

- 87.0% by weight of a chalk (Champagne chalk) treated with stearic acid and with a mean diameter of 2 micrometers;
- 10.0% by weight of an isotactic polypropylene with an MFI of 840 g/10 min (temperature 190° C., load 10 kg, die 1.05 mm) and 3.0% by weight of a grade 100 polypropylene copolymer sold by the company Montell under the name Moplen™ EP-N 31 MA.

The results obtained are equal to 1363 N/mm$^2$ for the modulus of elasticity in four-point bending in accordance with the standard DIN 53457 and 3.4 kJ/m$^2$ for Charpy impact at 23° C. in accordance with the standard DIN 53453.

Test No 56:

This test illustrates the invention and uses a dispersion containing 60% by weight of the high-density polyethylene resin sold by the company Plüss-Staufer under the name Hostalen™ GD 7225 and 40% by weight of the master batch according to the invention with the composition:

- 87.0% by weight of a chalk (Champagne chalk) treated with stearic acid and with a mean diameter of 2 micrometers;
- 8.5% by weight of an isotactic polypropylene with an MFI of 840 g/10 min (temperature 190° C., load 10 kg, die 1.05 mm) and 4.5% by weight of a grade 100 polypropylene copolymer sold by the company Montell under the name Moplen™ EP-N 31 MA.

The results obtained are equal to 1333 N/mm$^2$ for the modulus of elasticity in four-point bending in accordance with the standard DIN 53457 and 3.6 kJ/m$^2$ for Charpy impact at 23° C. in accordance with the standard DIN 53453.

Test No 57:

This test illustrates the invention and uses a dispersion containing 60% by weight of the high-density polyethylene resin sold by the company Plüss-Staufer under the name Hostalen™ GD 7225 and 40% by weight of the master batch according to the invention with the composition:

- 87.0% by weight of a chalk (Champagne chalk) treated with stearic acid and with a mean diameter of 2 micrometers;
- 7.0% by weight of an isotactic polypropylene with an MFI of 840 g/10 min (temperature 190° C., load 10 kg, die 1.05 mm) and 6.0% by weight of a grade 100 polypropylene copolymer sold by the company Montell under the name Moplen™ EP-N 31 MA.

The results obtained are equal to 1309 N/MM$^2$ for the modulus of elasticity in four-point bending in accordance with the standard DIN 53457 and 3.4 kJ/m$^2$ for Charpy impact at 23° C. in accordance with the standard DIN 53453.

Test No 58:

This test illustrates a reference for which the mechanical properties are measured on the raw resin, namely the polypropylene homopolymer resin sold by the company Montell under the name Montell™ TM 1600 K.

The results obtained are equal to 914 N/mm$^2$ for the modulus of elasticity in four-point bending in accordance with the standard DIN 53457 and 2.6 kJ/m$^2$ for Charpy impact at 23° C. in accordance with the standard DIN 53453.

Test No 59:

This test illustrates the prior art and uses a dispersion containing 60% by weight of the polypropylene homopolymer resin sold by the company Montell under the name Montell™ TM 1600 K and 40% by weight of the master batch of test No 2 of the prior art.

The results obtained are equal to 1446 N/mm$^2$ for the modulus of elasticity in four-point bending in accordance with the standard DIN 53457 and 3.0 kJ/m$^2$ for Charpy impact at 23° C. in accordance with the standard DIN 53453.

Test No 60:

This test illustrates the invention and uses a dispersion containing 60% by weight of the polypropylene homopolymer resin sold by the company Montell under the name Montell™ TM 1600 K and 40% by weight of the master batch according to the invention with the composition:

- 87.0% by weight of a chalk (Champagne chalk) treated with stearic acid and with a mean diameter of 2 micrometers;
- 10.0% by weight of an isotactic polypropylene with an MFI of 840 g/10 min (temperature 190° C., load 10 kg, die 1.05 mm) and 3.0% by weight of a grade 100 polypropylene copolymer sold by the company Montell under the name Moplen™ EP-N 31 MA.

The results obtained are equal to 1805 N/mm$^2$ for the modulus of elasticity in four-point bending in accordance with the standard DIN 53457 and 3.0 kJ/m$^2$ for Charpy impact at 23° C. in accordance with the standard DIN 53453.

Test No 61:

This test illustrates the invention and uses a dispersion containing 60% by weight of the polypropylene homopolymer resin sold by the company Montell under the name Montell™ TM 1600 K and 40% by weight of the master batch according to the invention with the composition:

- 87.0% by weight of a chalk (Champagne chalk) treated with stearic acid and with a mean diameter of 2 micrometers;
- 8.5% by weight of an isotactic polypropylene with an MFI of 840 g/10 min (temperature 190° C., load 10 kg, die 1.05 mm) and 4.5% by weight of a grade 100 polypropylene copolymer sold by the company Montell under the name Moplen™ EP-N 31 MA.

The results obtained are equal to 1718 N/mm$^2$ for the modulus of elasticity in four-point bending in accordance with the standard DIN 53457 and 3.2 kJ/m$^2$ for Charpy impact at 23° C. in accordance with the standard DIN 53453.

Test No 62:

This test illustrates the invention and uses a dispersion containing 60% by weight of the polypropylene homopolymer resin sold by the company Montell under the name Montell™ TM 1600 K and 40% by weight of the master batch according to the invention with the composition:

- 87.0% by weight of a chalk (Champagne chalk) treated with stearic acid and with a mean diameter of 2 micrometers;
- 7.0% by weight of an isotactic polypropylene with an MFI of 840 g/10 min (temperature 190° C., load 10 kg, die 1.05 mm) and 6.0% by weight of a grade 100 polypropylene copolymer sold by the company Montell under the name Moplen™ EP-N 31 MA.

The results obtained are equal to 1754 N/mm$^2$ for the modulus of elasticity in four-point bending in accordance with the standard DIN 53457 and 3.1 kl/m$^2$ for Charpy impact at 23° C. in accordance with the standard DIN 53453.

Test No 63:

This test illustrates the invention and uses a dispersion containing 69% by weight of the polypropylene resin sold by the company Borealis under the name Borealis™ 202 E and 31% by weight of the master batch (corresponding to 25% by weight of mineral filler) according to the invention with the composition:

- 80.5% by weight of a talc with a granulometry such that 41% of the particles have a mean diameter of less than 5 micrometers;
- 18.5% by weight of an isotactic polypropylene with an MFI of 1038 g/10 min (temperature 190° C., load 10 kg, die 1.05 mm);
- 1.0% by weight of zinc stearate.

The results obtained are equal to 2212 N/mm$^2$ for the modulus of elasticity in four-point bending in accordance with the standard DIN 53457 and 12 kJ/m$^2$ for Charpy impact at 23° C. in accordance with the standard DIN 53453.

Test No 64:

This test illustrates the invention and uses a dispersion containing 69.88% by weight of the polypropylene resin sold by the company Borealis under the name Borealis™ 202 E and 30.12% by weight of the master batch (corresponding to 25% by weight of mineral filler treated) according to the invention with the composition:

- 41.5% by weight of a chalk (Champagne chalk) treated with stearic acid and with a mean diameter of 2 micrometers;
- 41.5% by weight of a talc with a granulometry such that 41% of the particles have a mean diameter of less than 5 micrometers;
- 16.5% by weight of an isotactic polypropylene with an MFI of 1038 g/10 min (temperature 190° C., load 10 kg, die 1.05 mm);
- 0.5% by weight of a dispersant of the fatty alcohol phosphate type sold by the company Coatex under the name Coatex Dopp-18.

The results obtained are equal to 1845 N/mm² for the modulus of elasticity in four-point bending in accordance with the standard DIN 53457 and 18 kJ/m² for Charpy impact at 23° C. in accordance with the standard DIN 53453.

Test No 65:

This test illustrates the invention and uses a dispersion containing 70.59% by weight of the polypropylene resin sold by the company Borealis under the name Borealis™ 202 E and 29.41% by weight of the master batch (corresponding to 25% by weight of mineral filler treated) according to the invention with the composition:

- 63.75% by weight of a chalk (Champagne chalk) treated with stearic acid and with a mean diameter of 2 micrometers;
- 21.25% by weight of a talc with a granulometry such that 41% of the particles have a mean diameter of less than 5 micrometers;
- 14.5% by weight of an isotactic polypropylene with an MFI of 1038 g/10 min (temperature 190° C., load 10 kg, die 1.05 mm);
- 0.5% by weight of a dispersant of the fatty alcohol phosphate type sold by the company Coatex under the name Coatex Dopp-18.

The results obtained are equal to 1670 N/mm² for the modulus of elasticity in four-point bending in accordance with the standard DIN 53457 and 22 kJ/m² for Charpy impact at 23° C. in accordance with the standard DIN 53453.

The different results obtained are set out in Table 3 below.

A reading of Table 3 shows that the selection of an isotactic polypropylene with high-fluidity greater than or equal to 200 g/10 min as previously measured makes it possible to obtain excellent mechanical properties whatever the redispersion resin or the filler making up the master batch.

The good impact properties characterise the good dispersion of the filler in the polymer matrix.

EXAMPLE 5

This example relates to the determination of the hardness of the products according to the invention.

For this purpose, for each of tests 66 to 68, the master batches according to the invention cooled to ambient temperature having been produced, in the form of pastes at approximately 190° C. and at a rate of 155 kg/h, by adding different constituents in a continuous double-screw mixer with a nominal capacity of 500 kg/h and terminating in a single-screw extruder, the Shore D hardness was measured using a hardness tester of the Zwick™ type and in accordance with the standard NF T 51-109, and with the stressing of the sample of filler concentrate, also referred to as the master batch.

Test No 66:

This test illustrates the prior art and uses a composition containing:

- 87% by weight of a chalk (Champagne chalk) treated with stearic acid and with a mean diameter of 2 micrometers;
- 13% by weight of amorphous polypropylene, with an MFI of 450 g/10 min (temperature 190° C., load 10 kg, die 1.05 mm) sold by the company Huntsman under the name Rexflex™ WL 125.

The hardness obtained was 66.

Test No 67:

This test illustrates the invention and uses a composition containing:

- 87% by weight of a chalk (Champagne chalk) treated with stearic acid and with a mean diameter of 2 micrometers;
- 9.1% by weight of amorphous polypropylene, with an MFI of 450 g/10 min (temperature 190° C., load 10 kg, die 1.05 mm) sold by the company Huntsman under the name Rexflex™ WL 125.

TABLE 3

| | Test No | Type of resin | Master batch % filler–%isotactic polypropylene | Modulus of elasticity under four-point bending (N/mm2) | Charpy impact at 23° C. (kJ/m2) |
|---|---|---|---|---|---|
| Prior art | 54 | HDPE | 88% chalk–0% IPP | 799 | 3.4 |
| Invention | 55 | HDPE | 87% chalk–8.5% IPP | 1363 | 3.4 |
| Invention | 56 | HDPE | 87% chalk–8.5% IPP | 1333 | 3.6 |
| Invention | 57 | HDPE | 87% chalk–8.5% IPP | 1309 | 3.4 |
| Reference | 58 | PPH | 0% | 914 | 2.6 |
| Prior art | 59 | PPH | 88% chalk–0% IPP | 1446 | 3.0 |
| Invention | 60 | PPH | 87% chalk–10% IPP | 1805 | 3.0 |
| Invention | 61 | PPH | 87% chalk–8.5% IPP | 1718 | 3.2 |
| Invention | 62 | PPH | 87% chalk–7% IPP | 1754 | 3.1 |
| Invention | 63 | PP | 80.5% talc–18.5% IPP | 2212 | 12.0 |
| Invention | 64 | PP | 41.5% chalk–41.5% talc–16.5% IPP | 1845 | 18.0 |
| Invention | 65 | PP | 63.75% chalk–21.25% talc–14.5% IPP | 1670 | 22.0 |

HDPE: High-density polyethylene
PPH: Polypropylene homopolymer
IPP: Isotactic polypropylene
PP: Polypropylene 3.9% by weight of an isotactic polypropylene with an MFI of 840 g/10 min (temperature 190° C., load 10 kg, die 1.05 mm).

The hardness obtained was 73.

Test No 68:

This test illustrates the invention and uses a composition containing:

87% by weight of a chalk (Champagne chalk) treated with stearic acid and with a mean diameter of 2 micrometers;

13% by weight of an isotactic polypropylene with an MFI of 840 g/10 min (temperature 190° C., load 10 kg, die 1.05 mm).

The hardness obtained was 76.

The above results show that the compounds according to the invention are harder than those of the prior art (76 and 73 are greater than 66), and that it is possible to adjust the hardness of the master batch by varying the composition of the organic part thereof.

EXAMPLE 6

This example relates to the use of master batches according to the invention in the extrusion of films.

For producing films of linear low-density polyethylene, also referred to as LLDPE, and for each of tests 70 to 76, the LLDPE resin is extruded in the presence of increasing quantities of master batch of test 14 according to the invention, using a flow meter of the Haake Rheocord™ type equipped with a double-screw extruder rotating at 30 revolutions/minute and by passing through the circular die at a temperature of 190° C. and whose diameter is increased before cooling by continuously injecting air at a pressure of 40 bars.

The cooling is effected under air.

Once the film is produced, the thickness thereof is measured.

Test No 69 corresponds to the reference, that is to say to the production of a film with a raw LLDPE resin which gives a film thickness of 9 micrometers.

The different quantities of master batch of test No 14 according to the invention used correspond to the mass percentages of chalk with respect to the weight of the resin as described below.

Test No 70:

This test, which illustrates the invention, corresponds to 5.3% chalk with respect to the weight of LLDPE and gives a film thickness of 11 micrometers.

Test No 71:

This test, which illustrates the invention, corresponds to 15.2% chalk with respect to the weight of LLDPE and gives a film thickness of 15 micrometers.

Test No 72:

This test, which illustrates the invention, corresponds to 28.7% chalk with respect to the weight of LLDPE and gives a film thickness of 19 micrometers.

Test No 73:

This test, which illustrates the invention, corresponds to 29.1% chalk with respect to the weight of LLDPE and gives a film thickness of 22 micrometers.

Test No 74:

This test, which illustrates the invention, corresponds to 45.6% chalk with respect to the weight of LLDPE and gives a film thickness of 32 micrometers.

Test No 75:

This test, which illustrates the invention, corresponds to 51.7% chalk with respect to the weight of LLDPE and gives a film thickness of 31 micrometers.

Test No 76:

This test, which illustrates the invention, corresponds to 53.2% chalk with respect to the weight of LLDPE and gives a film thickness of 25 micrometers.

Thus, from a reading of the results, it can be seen that it is possible to obtain an extruded film containing the master batch according to the invention.

EXAMPLE 7

This example relates to the use of master batches according to the invention in calendering.

For this purpose, and for each test, a mixture of 60% by weight of raw polymer and 40% by weight of the composition of test No9 according to the invention is prepared on a roll mill.

For each test, the mill parameters are:

temperature of rolls: 170° C.;

distance between the rolls: 1 mm;

speed of rolls: 25 rpm.

Calendering is completed when the composition is visually homogeneous.

The modulus of elasticity in four point bend in accordance with the standard DIN 53457 and the Charpy impact at 23° C. in accordance with the standard DIN 53453 are determined for each test.

Test No 77:

This test illustrates the invention and uses, as a raw polymer, a homopolymer polypropylene, sold by the company Montell under the name TM 1600K.

The results obtained are equal to 1695 N/mm$^2$ for the modulus of elasticity in four point bending in accordance with the standard DIN 53457 and 2.9 kJ/m$^2$ for Charpy impact at 23° C. in accordance with the standard DIN 53453.

Test No 78:

This test illustrates the invention and uses, as a raw polymer, a high-density polypropylene, sold by the company Plüss-Staufer under the name Hostalen™ GC 7260.

The results obtained are equal to 1285 N/mm$^2$ for the modulus of elasticity in four point bending in accordance with the standard DIN 53457 and 3.4 kJ/m$^2$ for Charpy impact at 23° C. in accordance with the standard DIN 53453.

Thus, the reading of results shows that the master batches according to the invention can be used in calendering techniques.

What is claimed is:

1. A method for preparing a master batch comprising one or more mineral fillers and one or more polymers, comprising
    mixing the fillers with the polymers,
    wherein the polymers comprise at least one isotactic polypropylene of high fluidity and having a crystallinity percentage greater than 20% measured by the DSC method, and the fillers are present in an amount of greater than 80% by weight in the master batch.

2. The method according to claim 1, wherein the polymers have a fluidity index greater than or equal to 200 g/10 mm, measured in accordance with the amended standard NF T 51-620 (190 C-10 kg-1.05 mm).

3. The method according to claim 2, wherein the polymers have a fluidity index greater than or equal to 500 g/10 mm, measured in accordance with the amended standard NF T51-620 (190 C-10 kg-1.05 mm).

4. The method according to claim 1, wherein the polymers comprise:
    30% to 100% of the isotactic polypropylene of high fluidity having a fluidity index measured in accordance with the amended standard NFT 51-620 of greater than or equal to 200 g/110 min (temperature 190 C, load 10 kg, die 1.05 mm);

0 to 70% of one or more amorphous, crystalline or both amorphous and crystalline polyolefins; and 0 to 5% of one or more additives.

5. The method according to claim 4, wherein at least one of the amorphous or crystalline polyolefins are selected from the group consisting of polypropylene, polyethylene, polymers comprising ethylenic monomers containing 2 to 6 atoms of carbon, copolymers comprising ethylenic monomers containing 2 to 6 atoms of carbon and mixtures thereof.

6. The method of claim 4, wherein the additives are selected from the group consisting of thermal stabilizers, antioxidants, anti-UV agents, dispersants, lubricants, dyes, plasticizers, antistatic agents, flame retardants, nucleation agents, metal-passivating agents and cupropassive agents.

7. The method according to claim 1, wherein the polymers consist of an isotactic polypropylene of high fluidity.

8. The method according to claim 1, wherein the polymers comprise at least one isotactic polypropylene of high fluidity and at least one other crystalline or amorphous olefinic polymer.

9. The method according to claim 8, wherein the other crystalline or amorphous olefinic polymer is a polyethylene.

10. The method according to claim 8, wherein the polymers comprise an isotactic polypropylene of high fluidity and a polyethylene.

11. The method of claim 1, wherein the polymers comprise at least one isotactic polypropylene of high fluidity and at least one other amorphous, atactic, substantially amorphous or substantially atactic olefinic copolymer or terpolymer.

12. The method according to claim 1, wherein the polymers have a crystallinity percentage between 30 and 90%.

13. The method according to claim 1, wherein the polymers have a crystallinity percentage between 50 and 85%.

14. The method of claim 1, wherein the fillers are present in the master batch in an amount of at least 82% by weight.

15. The master batch of claim 1, wherein the fillers are present in an amount of at least 80.5% by weight.

16. A master batch comprising one or more mineral fillers in an amount greater than 80% by weight, wherein said master batch has a fluidity index greater than or equal to 5 g/10 mm (190 C-5 kg-2.09 mm) measured in accordance with the standard NF T 51-620; and comprises at least one isotactic polypropylene of a high fluidity having a crystallinity percentage greater than 20%, measured by the DSC method.

17. The master batch according to claim 16, wherein the mineral fillers are selected from the group consisting of carbonates, natural calcium carbonates, chalks, calcites, marbles, synthetic carbonates, calcium carbonates precipitated at different stages of crystallisation, mixed salts of magnesium, mixed salts of calcium, dolomites, magnesium carbonate, zinc carbonate, lime, magnesia, barium sulphate, barite, calcium sulphate, silica, magnesium silicates, talc, wollastonite, clays, aluminum silicates, kaolins, mica, oxides of metals, oxides of alkaline earths, hydroxides of metals, hydroxides of alkaline earths, magnesium hydroxide, iron oxides, zinc oxide, glass fibre, glass powder, wood fibre, wood powder, mineral pigments, organic pigments, mixtures of titanium oxide and carbonates, and mixtures effected before or after the grinding of the minerals.

18. The master batch according to claim 17, wherein the mineral fillers are selected from the group consisting of natural calcium carbonates, chalks, calcites, marbles, synthetic carbonates, talc, magnesium hydroxide, barite, titanium dioxide, wollastonite, dolomites and mixtures thereof.

19. The master batch of claim 18, wherein the synthetic carbonate is a precipitated calcium carbonate.

20. A method for preparing a thermoplastic material comprising one or more mineral fillers, comprising mixing the master batch according to claim 16 with one or more thermoplastic materials, wherein said thermoplastic materials are selected from the group consisting of low-density polyethylenes, linear polyethylene, branched polyethylene, high-density polyethylenes, homopolymer polypropylene, copolymer polypropylenes, polyisobutylenes, copolymers obtained during the polymerisation of at least two comonomers selected from the group consisting of ethylene, propylene, and isobutylene; polyolefins modified by grafting, polyolefins modified by copolymerisations, halogenated polyolefins, EPDM modified polypropylenes, SEBS modified polypropylenes, mixtures of EPDM and SEBS modified polypropylenes, natural rubber, synthetic rubbers, natural elastomers, synthetic elastomers, thermoplastics, SBR rubbers (styrene-butadiene rubber), EPDM thermoplastics, SEBS thermoplastics and mixtures thereof.

21. The method of claim 20, wherein the thermoplastic material is at least one selected from the group consisting of maleic anhydride grafted polyolefins, halogenated polyolefins, EPDM modified polypropylenes, and SEBS modified polypropylenes.

22. The master batch of claim 16, wherein the mineral filler is present in an amount of from 80.5% to 95% by weight.

23. The master batch of claim 16, wherein the mineral filler is present in an amount of from 82% to 93% by weight.

24. The master batch of claim 16, wherein the fluidity index is greater than or equal to 8 g/10 min, measured in accordance with the amended standard NF T 51-620 (190 C-10 kg-1.05 mm).

25. The master batch of claim 16, wherein the isotactic polypropylene has a crystallinity percentage between 30 and 90%.

26. The master batch of claim 16, wherein the isotactic polypropylene has a crystallinity percentage between 50 and 85%.

27. A method for manufacturing a molded article, said method comprising forming the molded article by thermoforming by injection a composition comprising the master batch according to claim 16.

28. The method of claim 27, wherein the master batch is in the form of an aggregate or granulate.

29. A molded article obtained by the process of claim 27.

30. A method for forming a film or sheet, said method comprising extruding a composition comprising the master batch of claim 16 to form an extrudate, then blow molding the extrudate to form the film or sheet.

31. A film obtained by the method of claim 30.

32. A method comprising calendaring a composition comprising the master batch according to claim 16.

33. The method of claim 32, wherein the composition is in the form of aggregates or granulates.

34. A molded article obtained by the process of claim 32.

35. A method comprising,
extruding a composition comprising the master batch of claim 10 to form a film, a sheath, a tube, a profiled section, a wire, or a cable.

36. The master batch of claim 35, wherein the composition is in the form of aggregates or granulates.

37. The master batch according to claim 16, wherein the polymers have a fluidity greater than or equal to 500 g/10 min measured in accordance with the amended standard NF T 51-620 (190 C-10 kg-1.05 mm).

38. The master batch according to claim 16, wherein the polymers of the master batch consist of an isotactic polypropylene.

39. The master batch according to claim 16, wherein the master batch comprises at least one isotactic polypropylene and at least one other crystalline or amorphous olefinic polymer.

40. The master batch according to claim 16, wherein the master batch comprises a polyethylene.

41. The method of claim 1, wherein the isotactic polypropylene has a fluidity greater than or equal to 840 g/10 mm measured according to NF T51-620 (190 C-10 kg-1.05 mm).

42. The method of claim 1, wherein the isotactic polypropylene has a fluidity greater than 970 g/10 min measured according to NF T 51-620 (190 C-10 kg-1.05 mm).

43. The method of claim 1, wherein the isotactic polypropylene has a fluidity of from 840 to 1150 g/10 mm measured according to NF T 51-620 (190 C-10 kg-1.05 mm).

44. The master batch of claim 1, wherein the isotactic polypropylene has a fluidity of 840 g/10 min or greater measured according to NF T 51-620 (190 C-10 kg-1.05 mm).

45. The master batch of claim 16, wherein the isotactic polypropylene has a fluidity of 970 g/10 min or greater measured according to NFT 51-620 (190 C-10 kg-1.05 mm).

46. The master batch of claim 16, wherein the isotactic polypropylene has a fluidity of from 840 to 1150 g/10 min measured according to NFT 51-620 (190 C-10 kg-1.05 mm).

47. The method of claim 1, wherein the fillers are present in an amount of from 87 to 93% by weight.

48. The master batch of claim 16, wherein the fillers are present in an amount of from 87 to 93% by weight.

49. The master batch of claim 16, wherein the fillers are present in an amount of at least 82% by weight.

50. The master batch of claim 16, wherein the polymers have a fluidity greater than or equal to 200 g/10 mm measured in accordance with the amended standard NF T 51-620 (190° C.-10 kg-1.05 mm).

51. The master batch of claim 16, wherein the fillers are present in an amount of at least 80.5% by weight.

* * * * *